Figure 1:
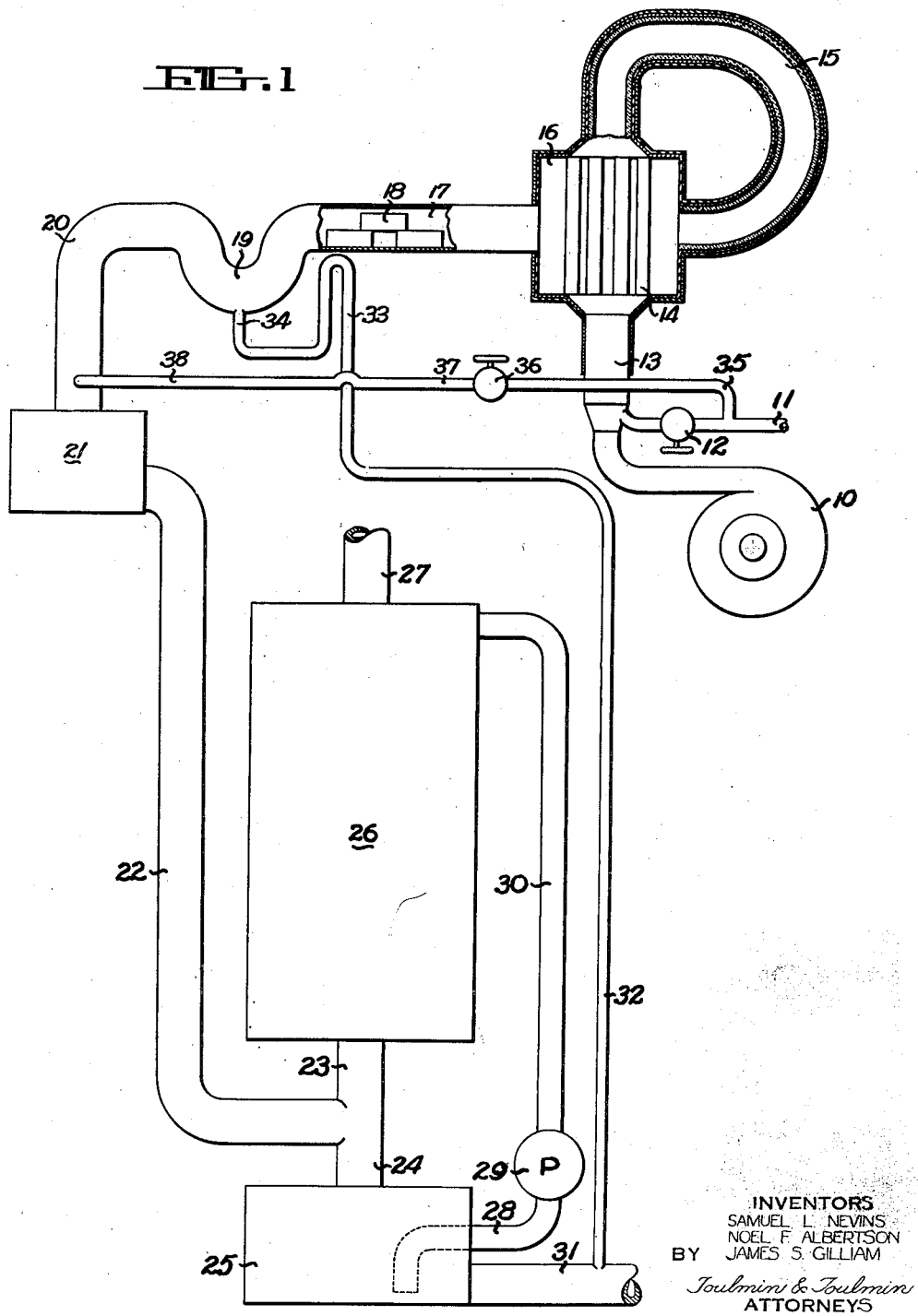

July 9, 1946.  S. L. NEVINS ET AL  2,403,451
METHOD FOR EXTRACTION OF SULPHUR FROM GASES
Filed July 11, 1942  2 Sheets-Sheet 1

INVENTORS
SAMUEL L. NEVINS
NOEL F. ALBERTSON
BY JAMES S. GILLIAM
Toulmin & Toulmin
ATTORNEYS

INVENTORS
SAMUEL L. NEVINS
NOEL F. ALBERTSON
BY JAMES S. GILLIAM

Toulmin & Toulmin
ATTORNEYS

Patented July 9, 1946

2,403,451

UNITED STATES PATENT OFFICE 2,403,451

METHOD FOR EXTRACTION OF SULPHUR FROM GASES

Samuel L. Nevins, Little Rock, Ark., Noel F. Albertson, Columbus, Ohio, and James S. Gilliam, Shreveport, La., assignors to Southern Acid and Sulphur Co., Inc., St. Louis, Mo., a corporation of Virginia Application July 11, 1942, Serial No. 450,602

6 Claims. (Cl. 23—225)

This invention relates to the recovery of sulphur in elemental form from gases containing hydrogen sulphide.

More particularly, this invention deals with method and apparatus whereby elemental sulphur may be produced by the treatment of gases extracted in the process of sweetening sour gases, such as casinghead gas or natural gas or refinery gases. The method of our invention is characterized by a high yield of elemental sulphur of high purity even when treating gases containing limited quantities of hydrogen sulphide. For example, a gas composed of approximately 25% hydrogen sulphide, 70% carbon dioxide and 5% hydrocarbons may be treated according to the method of our invention with a recovery of pure elemental sulphur approximating 100%.

In the sweetening of sour gas with regenerative liquid absorbents hydrogen sulphide, carbon dioxide, and other acidic constituents are extracted therefrom. These and other bodies which are absorbed by the regenerative liquid absorbent in the course of the sweetening process are given off later on when such liquid absorbent is regenerated for re-use. According to the present invention the gases which are given off in regenerating the liquid absorbent are treated according to procedures which will be described hereinafter and elemental sulphur is recovered which is of extremely high purity.

In essence, the method of the present invention consists in admixing the gases obtained from the regeneration of the regenerative liquid absorbent with air and causing the oxidation of the hydrogen sulphide therein under the influence of heat in the presence of a contact mass adapted to produce turbulent flow.

For example, in an instant application of the method of our invention gases from the regeneration of regenerative liquid absorbent used for sweetening sour gas is delivered under pressure in admixture with air in a ratio of 1.5 parts of air to one part of gas to a combustion chamber. The mixture is burnt in the combustion chamber and the heat generated is utilized in part for preheating air-gas mixture subsequently introduced into the combustion chamber. The combustion gases, for example, may be brought into contact with a body of large surface and as a result the gaseous mixture is caused to react in a converter wherein the mixture of gas containing hydrogen sulphide is brought into contact with a catalyst adapted to bring about a more rapid reaction.

Such sulphur as may precipitate out while the mixture of gas and air is in contact with the catalyst in the converter is withdrawn from the converter and brought to a central receiving vessel. The gaseous mixture which leaves the converter may carry in suspension a certain proportion of finely divided sulphur. Therefore, these gases are passed through a scrubbing tower through which molten sulphur is passed in countercurrent with the flow of gas. The molten sulphur utilized in this operation is obtained from the central receiving reservoir and the sulphur which is removed from the gas mixture in the course of the scrubbing operation is also delivered to the central receiving reservoir.

In another instant application of the method of our invention a mixture of gas containing hydrogen sulphide and of air is passed through a heat interchanging chamber which is heated by the heat of combustion of the gas-air mixture. The preheated mixture of gas and air after passing through the heat interchanging chamber is brought into a combustion chamber and directly passed through masses of catalysts. The resulting product is passed through a secondary reaction chamber wherein a further quantity of gas is admixed therewith. Elemental sulphur is formed in this secondary reaction chamber, and the formed sulphur is withdrawn through the bottom portion of the scrubbing tower. The residual gases are also withdrawn from the reaction chamber and introduced along the lower portion of the scrubbing tower through which molten sulphur is circulated in countercurrent with the flow of gases. The molten sulphur removes from the gas a substantial portion of the sulphur entrained therewith. However, a small proportion of sulphur flowers remains in the gas and in order to recover them the gas exhausted from the scrubbing tower is introduced into a secondary tower wherein it is brought into countercurrent contact with a water spray. This spray of water effectively precipitates the sulphur flowers from the gas stream and these flowers are separated and either consolidated with the molten sulphur previously obtained or stored separately for sale as a distinct product.

Figure 2:
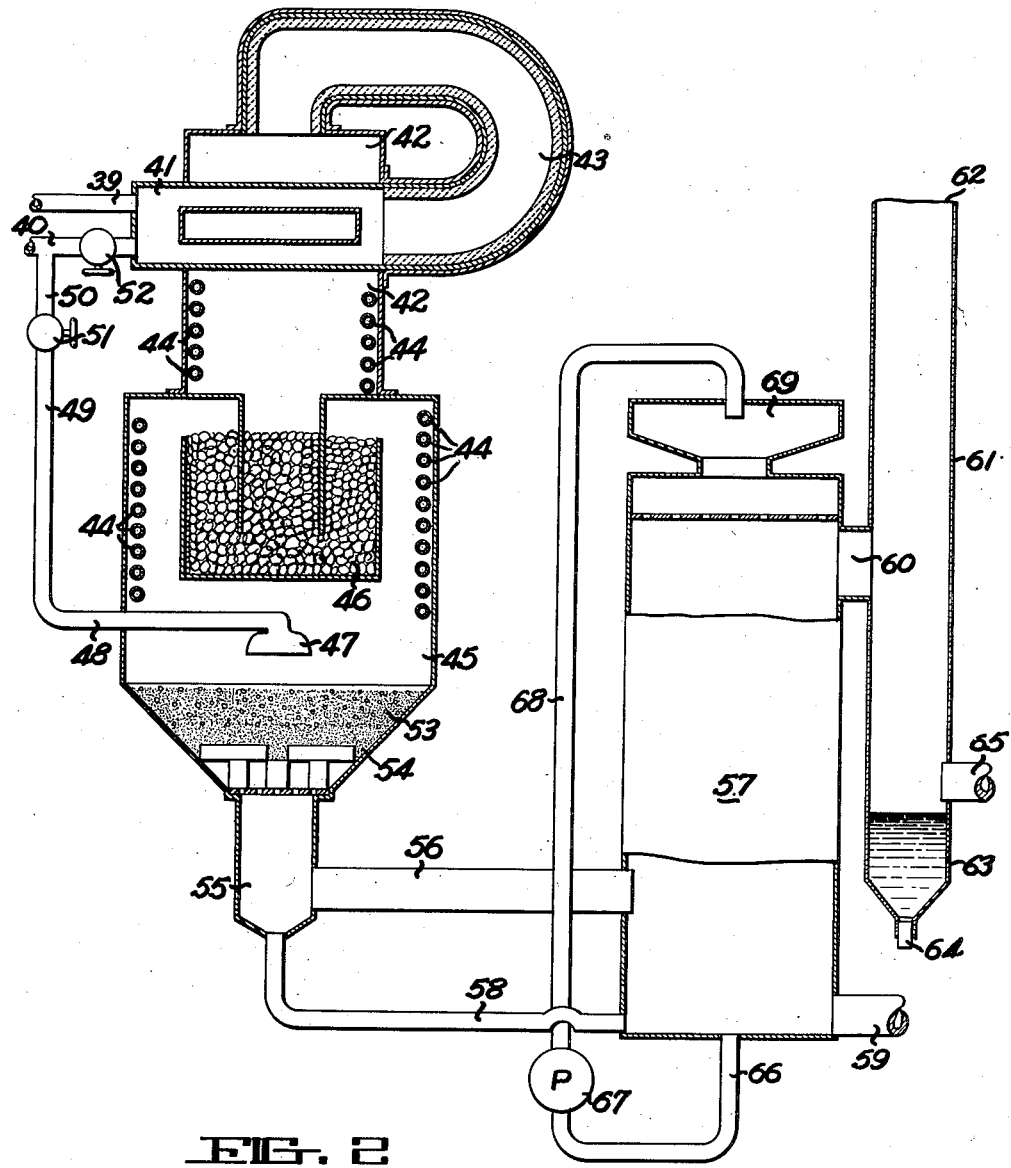

The present invention and the manner in which it may be carried out advantageously will be better understood by reference to the annexed drawings in which:

Fig. 1 is a diagrammatic view partly in cross-section of an apparatus adapted for the practice of our invention; and Fig. 2 is a diagrammatic view partly in cross-section illustrative of another type of apparatus which may be used advantageously in practicing the method of our invention.

Referring now to Fig. 1, 10 is a source of air such as a fan or pressure blower, 11 is a pipe connected to a source of gas not shown containing hydrogen sulphide. 12 is a valve to regulate the flow of gas. 13 is a mixing chamber wherein the gas entering through pipe 11 and valve 12 is admixed with the air supplied by fan 10 and begins to burn. 14 is a combustion chamber. 15 is a duct wherein the combustion mixture continues to burn. 16 is a heat interchanger through which the combustion mixture is superheated. 17 is a reactor or reaction chamber wherein the products of combustion are brought into contact with material of large surface area 18. 19 is a trap adapted to collect such elemental sulphur as may precipitate from the gases leaving the reaction chamber 17. 20 is a duct connecting the trap 19 with the converter 21 wherein the catalyst is disposed. Duct 20 is of sufficient length to effect substantial cooling of the gases before they enter the converter 21. 22 is a duct through which the gases leaving the converter as well as the elemental sulphur precipitated therein are conducted to duct 23. 24 is a duct through which the precipitated sulphur is conducted from 22 to the receiver 25. 26 is a scrubbing tower through which the gases are conducted from duct 23. 27 is the exhaust duct for desulphurized gases leaving the scrubbing tower 26. 28 is the suction line connecting pump 29 with receiver 25. 30 is the discharge line from pump 29 to the upper portion of the scrubbing tower 26. 31 is the duct through which the molten sulphur is withdrawn from the receiver 25. 32 is a line connecting duct 31 with gooseneck 33, line 34, and trap 19 for the withdrawal of sulphur from the latter.

A branch line 35 provided with valve 36 is connected with line 11 and is adapted to introduce gas containing hydrogen sulphide through line 37 and branch line 38 into duct 20.

Referring now to Fig. 2, line 39 connects with a source of air (not shown) and line 40 connects with a source of gas (not shown) containing hydrogen sulphide. 41 is a preheating chamber set in combustion chamber 42 and connected therewith through duct 43. Pipes 44 are positioned within the combustion chamber 42 and are adapted to carry air or any other material which it is desired to heat by absorption of heat from the combustion chamber 42. Within the reaction chamber 45 and in communication with the combustion chamber 42 there is positioned a contact mass 46. The distributor 47 within the reaction chamber 45 is connected through pipes 48, 49 and 50 and valve 51 with line 40 carrying the gas containing hydrogen sulphide. Valve 52 in line 40 regulates the flow of gas containing hydrogen sulphide to preheater 41 while valve 51 regulates the flow of gas containing hydrogen sulphide from line 40 through lines 50, 49 and 48 to spray head 47. Distributor 47 serves to admix a predetermined quantity of raw gas containing hydrogen sulphide with the gases leaving the contact body 46 and entering the reaction chamber 45. Chamber 55 provides an exit from the lower portion 54 of reaction chamber 45 and is connected through duct 56 to scrubber 57 and through line 58 to the lower portion of scrubber 57. Such sulphur as may separate in the lower portion 54 of the reaction chamber 45 is withdrawn therefrom through chamber 55 and line 58 to scrubber 57 from which it may be withdrawn in turn through duct 59. The residual gas is removed through chamber 55 and from there through duct 56 connected to scrubber 57. The gases which enter the scrubber 57 through duct 56 rise through the scrubber 57 and exit through duct 60 connected to the spray column 61 and eventually leave the system through the top 62 of spray column 61. Molten sulphur is withdrawn from the bottom of scrubber 57 through line 66 by pump 67 and delivered through line 68 to the head 69 of the scrubber 57. The molten sulphur cascades through the scrubber 57 and is brought into intimate contact with the gas ascending through the scrubber 57. The molten sulphur used in scrubbing the gas, or at least that portion which is not recirculated, is withdrawn through duct 59 to storage. The gases leaving the scrubbing tower 57 through duct 60 are brought into intimate contact with a water spray in spray column 61. The sulphur flowers and such unreacted gases as may be present in the gas leaving the scrubbing tower 57 through duct 60 and entering the spray tower 61 are washed out of the gas and concentrate on lower portion 63 of the spray column 61. This sulphur may be withdrawn from the lower portion 63 of the spray column 61 by removing the plug 64 or through duct 65. Obviously the sulphur precipitated from the gas in spray column 61 would be mixed with water and is separated therefrom by any of the well-known methods.

As a typical example of an application of the method of our invention in an apparatus such as diagrammatically illustrated in Fig. 1, we shall now describe the manner in which sulphur may be produced in elemental form from gas containing hydrogen sulphide.

The valve 12 is opened to admit a flow of gas containing hydrogen sulphide from line 11 and the blower 10 is then placed in motion. The air and the gas containing hydrogen sulphide thoroughly mix and begin to burn in the mixing chamber 13. The mixture continues to burn as it passes through the combustion chamber 14 and the duct 15. The temperature in the combustion chamber 14 for example may be approximately 2400° F. The burning mixture of gas containing hydrogen sulphide and air passes through the heat interchanger 16 which surrounds the combustion chamber 14 and enters the reaction chamber 17 wherein it is brought into intimate contact with a contact mass having a large surface area. Broken or unbroken unglazed ceramic tile may be used advantageously as the contact mass 18 in the reaction chamber 17. A certain proportion of elemental sulphur may be obtained at this stage and it is collected in trap 19 from which it is withdrawn through line 34, gooseneck 33 and line 32 and delivered to duct 31 for delivery to storage. The gas passing through trap 19 enters the converter 21 through duct 20. The converter 21 contains a body of catalyst which may be advantageously a charge of activated bauxite. The mixture of gas containing hydrogen sulphide is caused to react further by the action of the catalyst contained in the converter 21 and such elemental sulphur as may separate therein is withdrawn in molten form together with the residual gas through duct 22 which connects with ducts 23 and 24. The molten sulphur enters the receiver 25 through duct 24 while the gas enters the scrubbing tower 26 through duct 23. Molten sulphur is picked up from the receiver 25 through the suction line 28 of the pump 29 and delivered through the discharge line 30 of the pump to the upper portion of the scrubber 26. The molten sulphur introduced in the upper portion of the scrubber 26 cascades downwardly through the scrubber and is thus brought into intimate contact with the gases traveling countercurrent upwardly through the scrubber 26. The scrubbing action of the molten sulphur will remove from the gas the sulphur particles entrained therewith and the scrubbing liquid as well as the substances which it removes from the gas will return through ducts 23 and 24 to the receiver 25 while the stripped gas leaves the scrubber 26 through the exit duct 27.

As has been noted hereinbefore, in a typical case the temperature in the combustion chamber 14 is approximately 2400° F. As the gases enter the reaction chamber 17 the temperature will be in the neighborhood of 1400° F. and in entering duct 20 the temperature will be approximately 1100° F. The duct 20 is of sufficient length to cool the gases considerably, so that when the gases enter the converter 21 the temperature will be approximately 660° F. The gases are further cooled in duct 22 so that a portion of the sulphur vapor will be condensed to molten form. The molten sulphur, collected in the receiver 25, is pumped through duct 30 to the upper portion of the scrubbing tower 26, and then passes downwardly through the tower in countercurrent flow to the rising gases, thus cooling the sulphur vapor to liquid form. Thus, the molten sulphur pumped to the top of the tower, and the sulphur vapors condensed within the tower, are collected in the receiver 25. The temperature of the sulphur leaving the receiver 25 and going into storage will be approximately 275° F. It will be understood, of course, that these temperatures are those obtained in a specific instance of the practice of the method of our invention and that they are not recited herein as limitations.

It will be noted that provision is made for increasing the content of hydrogen sulphide in the gas entering the converter 21 by the addition of a further quantity of gas containing hydrogen sulphide from line 11 through lines 35, 37 and 38 and valve 36 into duct 20.

As a further example of an instant practice of the method of our invention, the following description is given in connection with the apparatus illustrated in Fig. 2.

Air under pressure is introduced through line 39 into heat interchanger or preheater 41 while simultaneously gas containing hydrogen sulphide is introduced through line 40 and valve 52 into the preheater 41. The mixture of air and gas is thoroughly mixed in passing through the preheater 41 wherein it begins to burn.

The combustion gases pass downwardly from the combustion chamber 42 into the contact mass 46 and therethrough into the reaction chamber 45 wherein a further amount of gas containing hydrogen sulphide is added through spray head 47 which connects through lines 48, 49 and 50 and valve 51 with line 40. The reaction chamber 45 is provided in its lower portion 54 with a catalyst body 53 adapted to cause further conversion of the hydrogen sulphide in the gas. The residual gas also passes downwardly from the bottom portion 54 of the reaction chamber 45 through chamber 55 and line 56 into the scrubber 57 through which it flows upwardly. Molten sulphur is withdrawn from the bottom of scrubber 57 through conduit 59 and delivered to storage. At the same time molten sulphur is removed from the bottom of the scrubber 57 through suction line 66 of pump 67 and delivered through line 68 to the head 69 of scrubber 57. The molten sulphur then cascades through the scrubber 57 in countercurrent with the gas entering the scrubber through line 56 and leaving the scrubber through conduit 60. The scrubbing action of the molten sulphur flowing downwardly through scrubber 57 while the gas travels upwardly therethrough results in the removal from the gas of sulphur particles and vapor entrained therewith which are precipitated and withdrawn from the bottom of the scrubber 57 through conduit 59 to storage or through line 66 for recirculation. The gas leaving the scrubber 57 enters the spray column 61 through conduit 60. The spray column 61 is provided at its upper end with a water spray head (not shown). The gases travel upwardly through the spray column 61 and leave the column at its upper end 62 while the water which sprays down through the column and carries with it the sulphur flowers which had entrained with the gases leaving scrubber 57 through conduit 60 travels downwardly and is collected in the bottom portion 63 of the spray column 61.

The suspension of sulphur flowers in water which collects at the bottom portion 63 of the spray column 61 may be withdrawn therefrom by either removing the plug 64 or through the pipe 65. The sulphur and water may be separated from each other according to any of the well-known methods.

As the burning mixture of air and gas containing hydrogen sulphide travels through the conduit 43 and enters the combustion chamber 42 the temperature will reach approximately 2400° F. As the heat of the combustion gases is partially absorbed by the gas and air mixture passing through preheater 41, the temperature of the gases in the combustion chamber 42 drops to approximately 1600° F. to 1800° F. In the reaction chamber 45 the temperature is approximately 600° F. to 1000° F. while in the upper portion of the chamber 55 the temperature is approximately 800° F. In chamber 46 the temperature is 1400 to 1800° F. The temperature of the gas entering the scrubber 57 through conduit 56 is approximately 350° F. It will be understood, of course, that these temperatures are given as indicative of temperatures which have been determined in a present application of the method of our invention and that they are not intended to be considered as limitations.

The scrubbing towers 26 and 57 may be of any standard design. For example, bubble cap columns are quite satisfactory for use in the practice of the method of our invention. Scrubbing towers packed with Raschig rings, saddles and other ceramic forms are quite satisfactory for the purpose. Likewise perforated plate columns and spray towers may be used with satisfaction.

The conduits 15 and 43 are lined with refractory material and they may be advantageously packed with refractory material of large surface area to provide a more uniform and intimate contact between the gas containing hydrogen sulphide and the air and to insure a better distribution and retention of heat during the passage of the mixture therethrough.

The pipes 44 in the combustion chamber 42 and in the reaction chamber 45 are suitable for preheating materials to be used in the process or elsewhere. They are not requisite in the carrying out of the process of our invention, but they may be used if it is so desired as a means for preheating or superheating fluids of various sorts and as a heat economizing means.

The packing 18 in the reaction chamber 17 (Fig. 1) may be unglazed ceramic tile either whole or broken or any other mass possessing a large surface which is heat resisting or refractory and which is not attacked chemically by the substances with which it comes into contact. The contact mass 46 (Fig. 2) may be of similar material although when this type of construction is employed it is advantageous to provide a contact mass comprising broken pieces or particles of irregular size and shape in order to provide thorough and intimate contact.

The catalyst employed in the converter 21 (Fig. 1) may be advantageously an activated bauxite. The size of the granules or pieces may be varied at will depending upon individual preference and conditions but it is generally necessary to provide a catalyst bed which does not offer great resistance to the passage of the gas mixture, and which will provide intimate contact with the gases flowing therethrough. The catalyst body 53 (Fig. 2) may be of the same general nature.

The activated bauxite catalyst may be supported in various manner depending upon individual preference and conditions; however, in a present application of the method of our invention we have found it advantageous to provide a latticework of carborundum bricks supported on a steel grille and to place the catalyst body thereupon.

While the conduit 15 (Fig. 1) and the conduit 43 (Fig. 2) have been illustrated as comprising a single element, it will be understood that one or more of these may be employed depending on the conditions to be met and the preference of the individual. It is not our intention to limit ourselves to the particular contour or design illustrated since this element may be constructed in various manner without detracting from its usefulness and efficiency.

It will be understood by those skilled in the art that the gooseneck 33 (Fig. 1) is provided for the purpose of preventing outflow of gas from the system of which trap 19 forms a part without having such gas traverse the converter 21 and the scrubber 26 by flowing through ducts 20, 22, 23 and 27.

It will be further understood by those skilled in the art that while we have illustrated a fan or pressure blower 10 (Fig. 1) we do not intend to limit ourselves to the use of such an appliance. Obviously other types of apparatus adapted for delivery of air under pressure may be employed satisfactorily. Likewise use may be made of a gas jet for drawing in the required volume of air for admixture with the gas containing hydrogen sulphide.

The spray tower 61 (Fig. 2) is purely optional. In a present application of the method of our invention it has been found beneficial and satisfactory but it will be understood by those skilled in the art that it may be dispensed with and substantially the same results obtained by increasing the height and thereby the efficiency of the scrubbing tower 57 with which it is associated and providing means for exhausting the stripped air from the scrubber.

It will be understood that while we have described in detail certain specific embodiments of our invention it is not our intention to have our invention limited to or circumscribed by the specific details of construction, arrangement of parts or procedure herein described and illustrated in view of the fact that our invention is susceptible to many modifications without departing from the spirit of this disclosure and the scope of the appended claims.

We claim:

1. The method of recovering sulphur in elemental form from gases containing hydrogen sulphide which comprises: mixing the gas with air; causing partial combustion of the mixture in a reaction chamber; bringing the hot combustion mixture into indirect heat interchange relationship with the mixture of incoming gases before combustion through a heat conducting means to heat the mixture of incoming gases to combustion temperature; passing the combustion gases through a contact mass; cooling the gases; adding to the gaseous mixture a further quantity of gas containing hydrogen sulphide; passing the enriched mixture over an oxidation catalyst; removing part of the sulphur produced to storage, and scrubbing the residual gas with another portion of the sulphur produced.

2. The method of recovering sulphur in elemental form from gases containing hydrogen sulphide which comprises: mixing the gas with air; causing partial combustion of the mixture in a reaction chamber; bringing the hot combustion mixture into indirect heat interchange relationship with the mixture of incoming gases before combustion through a heat conducting means to heat the mixture of incoming gases to combustion temperature; passing the combustion gases through a contact mass; cooling the gases; thereafter passing the gases through an oxidation catalyst; removing part of the sulphur produced to storage; and scrubbing the residual gas with another portion of the sulphur produced.

3. The method of recovering sulphur in elemental form from gases containing hydrogen sulphide which comprises: mixing the gas with air; causing partial combustion of the mixture in a reaction chamber; bringing the hot combustion mixture into indirect heat interchange relationship with the mixture of incoming gases before combustion through a heat conducting means to heat the mixture of incoming gases to combustion temperature; passing the combustion gases through a contact mass; cooling the gases; adding to the gaseous mixture a further quantity of gas containing hydrogen sulphide; passing the enriched mixture over an oxidation catalyst; removing part of the sulphur produced to storage; scrubbing the residual gas with another portion of the sulphur produced; and thereafter passing said gas through a water spray to remove particles suspended therein.

4. The method of recovering sulphur in elemental form from gases containing hydrogen sulphide which comprises: mixing the gas with air; causing partial combustion of the mixture in a reaction chamber; bringing the hot combustion mixture into indirect heat interchange relationship with the mixture of incoming gases before combustion through a heat conducting means to heat the mixture of incoming gases to combustion temperature; passing the gases through a contact mass; cooling the gases; separating molten elemental sulphur from the gas stream; adding to the gaseous mixture a further quantity of gas containing hydrogen sulphide; passing the enriched mixture over an oxidation catalyst; removing parts of the sulphur produced to storage; and scrubbing the residual gas with another portion of the sulphur produced.

5. The method of recovering sulphur in elemental form from gases containing hydrogen sulphide which comprises: mixing the gas with air; causing partial combustion of the mixture in a reaction chamber; bringing the hot combustion mixture into indirect heat interchange relationship with the mixture of incoming gases before combustion through a heat conducting means to heat the mixture of incoming gases to combustion temperature; passing the gases through a contact mass; cooling the gases; separating molten elemental sulphur from the gas stream; adding to the gaseous mixture a further quantity of gas containing hydrogen sulphide; passing the enriched mixture over an oxidation catalyst; separating a further quantity of sulphur from the gas stream; and scrubbing the residual gas with molten sulphur.

6. The method of recovering sulphur in elemental form from gases containing hydrogen sulphide which comprises: mixing the gas with air; causing partial combustion of the mixture in a reaction chamber; bringing the hot combustion mixture into indirect heat interchange relationship with the mixture of incoming gases before combustion through a heat conducting means to heat the mixture of incoming gases to combustion temperature; passing the gases through a contact mass; cooling the gases; separating molten elemental sulphur from the gas stream; adding to the gaseous mixture a further quantity of gas containing hydrogen sulphide; passing the enriched mixture over an oxidation catalyst; separating a further quantity of sulphur from the gas stream; thereafter scrubbing the gas with molten sulphur; and finally passing the residual gas through a water spray.

SAMUEL L. NEVINS.
NOEL F. ALBERTSON.
JAMES S. GILLIAM.